(12) United States Patent
Tanaka et al.

(10) Patent No.: US 10,688,844 B2
(45) Date of Patent: Jun. 23, 2020

(54) ENGINE HEAT RETENTION STRUCTURE

(71) Applicant: Mazda Motor Corporation, Aki-gun, Hiroshima (JP)

(72) Inventors: Yukiya Tanaka, Higashihiroshima (JP); Kazumi Okamura, Hatsukaichi (JP); Tomo Fujiaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/019,546

(22) Filed: Jun. 27, 2018

(65) Prior Publication Data
US 2019/0061460 A1 Feb. 28, 2019

(30) Foreign Application Priority Data
Aug. 22, 2017 (JP) .................. 2017-159182

(51) Int. Cl.
*B60K 5/00* (2006.01)
*B60H 1/00* (2006.01)
*B60K 5/12* (2006.01)
*B60K 11/06* (2006.01)
*B60K 11/08* (2006.01)

(52) U.S. Cl.
CPC ........... *B60H 1/00028* (2013.01); *B60K 5/12* (2013.01); *B60K 5/1208* (2013.01); *B60K 11/06* (2013.01); *B60K 11/08* (2013.01)

(58) Field of Classification Search
CPC .... B60H 1/00028; B60K 11/06; B60K 11/08; B60K 11/085
See application file for complete search history.

(56) References Cited

U.S. PATENT DOCUMENTS

| 2,972,340 | A | * | 2/1961 | Bertsch | B60R 13/0838 |
| | | | | | 123/41.6 |
| 3,540,425 | A | * | 11/1970 | Skatsche | F02B 77/13 |
| | | | | | 123/195 C |
| 4,077,383 | A | * | 3/1978 | Hatz | F02B 77/13 |
| | | | | | 123/195 C |
| 4,164,262 | A | * | 8/1979 | Skatsche | B60K 11/04 |
| | | | | | 123/195 C |
| 4,940,100 | A | * | 7/1990 | Ueda | B60K 11/08 |
| | | | | | 123/41.31 |
| 5,005,534 | A | * | 4/1991 | Washizu | F02B 27/0252 |
| | | | | | 123/184.43 |
| 5,873,708 | A | * | 2/1999 | Delhomme, II | F04B 35/002 |
| | | | | | 181/204 |

(Continued)

FOREIGN PATENT DOCUMENTS

JP 2013119384 A 6/2013

*Primary Examiner* — Hau V Phan
(74) *Attorney, Agent, or Firm* — Alleman Hall Creasman & Tuttle LLP

(57) ABSTRACT

A vehicle is provided, which includes an engine bay having an upper wall, side walls, a front wall, and a rear wall, an engine disposed inside the engine bay, and a dedicated heat retention member provided inside the engine bay, the dedicated heat retention member comprising an upper lid part covering the engine from above to be openable and closable, and side-wall parts covering a side of the engine. A portion of the side-wall parts is comprised of an engine mount bracket configured to support mounts of the engine, instead of the dedicated heat retention member.

5 Claims, 10 Drawing Sheets

(56) References Cited

U.S. PATENT DOCUMENTS

| | | | | |
|---|---|---|---|---|
| 7,523,798 B2* | 4/2009 | Muramatsu | ............ | B60K 11/08 |
| | | | | 180/68.1 |
| 8,181,728 B2* | 5/2012 | Hartland | ................ | B60K 11/08 |
| | | | | 180/68.1 |
| 8,807,630 B2* | 8/2014 | Rode | .................... | B60K 11/085 |
| | | | | 296/180.2 |
| 9,016,411 B2* | 4/2015 | Nam | .................... | B60K 11/085 |
| | | | | 165/44 |
| 9,574,529 B2* | 2/2017 | Nam | .................... | F02M 35/161 |
| 2006/0181071 A1* | 8/2006 | Mitsui | .................. | B62D 21/155 |
| | | | | 280/784 |
| 2013/0140852 A1* | 6/2013 | Takeda | .................... | B60K 5/12 |
| | | | | 296/203.02 |
| 2013/0146376 A1 | 6/2013 | Nam et al. | | |
| 2013/0249245 A1* | 9/2013 | Sekiguchi | ............ | B62D 25/082 |
| | | | | 296/187.09 |
| 2015/0314810 A1* | 11/2015 | Watanabe | ................ | B60K 5/12 |
| | | | | 296/203.02 |
| 2015/0360726 A1* | 12/2015 | Yuge | ...................... | B62D 21/11 |
| | | | | 180/312 |
| 2017/0101134 A1* | 4/2017 | Miyazaki | ................ | A01C 11/02 |
| 2017/0218832 A1* | 8/2017 | Kurokawa | .......... | F01N 13/1805 |

* cited by examiner

US 10,688,844 B2

ENGINE HEAT RETENTION STRUCTURE

TECHNICAL FIELD

The present disclosure relates to a heat retention structure of an engine including a dedicated heat retention member comprised of an upper lid part covering the engine from above to be openable and closable, and side-wall parts covering a side of the engine.

BACKGROUND OF THE DISCLOSURE

Generally, if a vehicle is stopped outdoors for a given period of time (e.g., 8 hours or longer), the engine temperature drops to the ambient temperature. In order to prevent the engine temperature from falling to the ambient temperature, a heat retention member comprised of an upper lid part covering the engine from above and side-wall parts covering the sides of the engine may be provided. The heat retention member suppresses the drop of the engine temperature, makes a restart of the engine possible from the highest possible temperature, reduces the fuel injection amount during an engine warm-up, improves fuel consumption, makes a quick engine warm-up possible, and keeps engine oil warm. Therefore, a temperature drop of the engine oil can be suppressed, and a slide resistance of the engine oil can also be reduced. That is, the heat retention member can achieve both the quick engine warm-up (an improvement in fuel consumption) and the reduction in the slide resistance of the engine oil.

JP2013-119384A discloses an engine encapsulation structure of a vehicle which includes a dedicated covering member (a heat retention member) covering the engine from above and the side. However, as JP2013-119384A does not disclose how to reduce the weight and the cost of the covering member, there is room for improvement.

SUMMARY OF THE DISCLOSURE

Therefore, one purpose of the present disclosure is to provide a heat retention structure of the engine, capable of omitting a portion of side-wall parts of a heat retention member by substituting the portion of the side-wall parts with an engine mount bracket to reduce the weight and cost of the structure.

According to one aspect of the present disclosure, a vehicle is provided which includes an engine bay having an upper wall, side walls, a front wall, and a rear wall, an engine disposed inside the engine bay, and a dedicated heat retention member provided inside the engine bay, the dedicated heat retention member comprising an upper lid part covering the engine from above to be openable and closable, and side-wall parts covering sides of the engine. A portion of the side-wall parts is comprised of an engine mount bracket configured to support a mount of the engine, instead of the dedicated heat retention member.

According to this structure, since the portion of the side-wall parts of the heat retention member is substituted with the engine mount bracket, the side-wall parts are omitted in favor of the portion, thereby reducing the weight and cost of the heat retention member.

The engine mount bracket may be attached to an upper surface of the front side frame at two, front and rear, attachment parts, and a vertical wall part may be formed in the engine mount bracket to cover a space between the front and rear attachment parts.

According to this structure, since the vertical wall parts are formed, heat loss from the engine mount bracket is reduced.

The side-wall parts of the dedicated heat retention member may be comprised of a resin member, and the engine mount bracket may be comprised of a metal member. The upper lid part may be placed on and supported by an upper surface part of the engine mount bracket.

According to this structure, since the upper lid part is supported by the upper surface part of the engine mount bracket, support rigidity for supporting the upper lid part is improved, and a load applied to the side-wall parts of the heat retention member is reduced.

A mount rubber may be attached to the engine mount bracket. A space may be formed between the mount rubber and a mount bracket part above the mount rubber, and an arm part extending straight inward in vehicle width directions from the mount rubber toward the engine may be provided.

According to this structure, since the engine mount bracket is provided with the arm part extending laterally from the mount rubber toward the engine, the arm part prevents the heat, which moves upward from the lower part of the mount rubber, from escaping through the space.

The arm part may be disposed substantially at a same height as the space.

According to this structure, since the arm part is disposed substantially at the same height as the space, the heat loss via the space is further reduced.

DETAILED DESCRIPTION OF THE DISCLOSURE

The purpose of reducing the weight and cost of a heat retention member by substituting a portion of side-wall parts of the heat retention member with an engine mount bracket to omit the portion of side-wall parts is achieved by a heat retention structure of an engine which includes a dedicated heat retention member comprised of an upper lid part covering the engine from above so as to be openable and closable, and side-wall parts covering a side of the engine, where the portion of the side-wall parts is comprised of an engine mount bracket which supports a mount of the engine.

Embodiment

Figure 1:
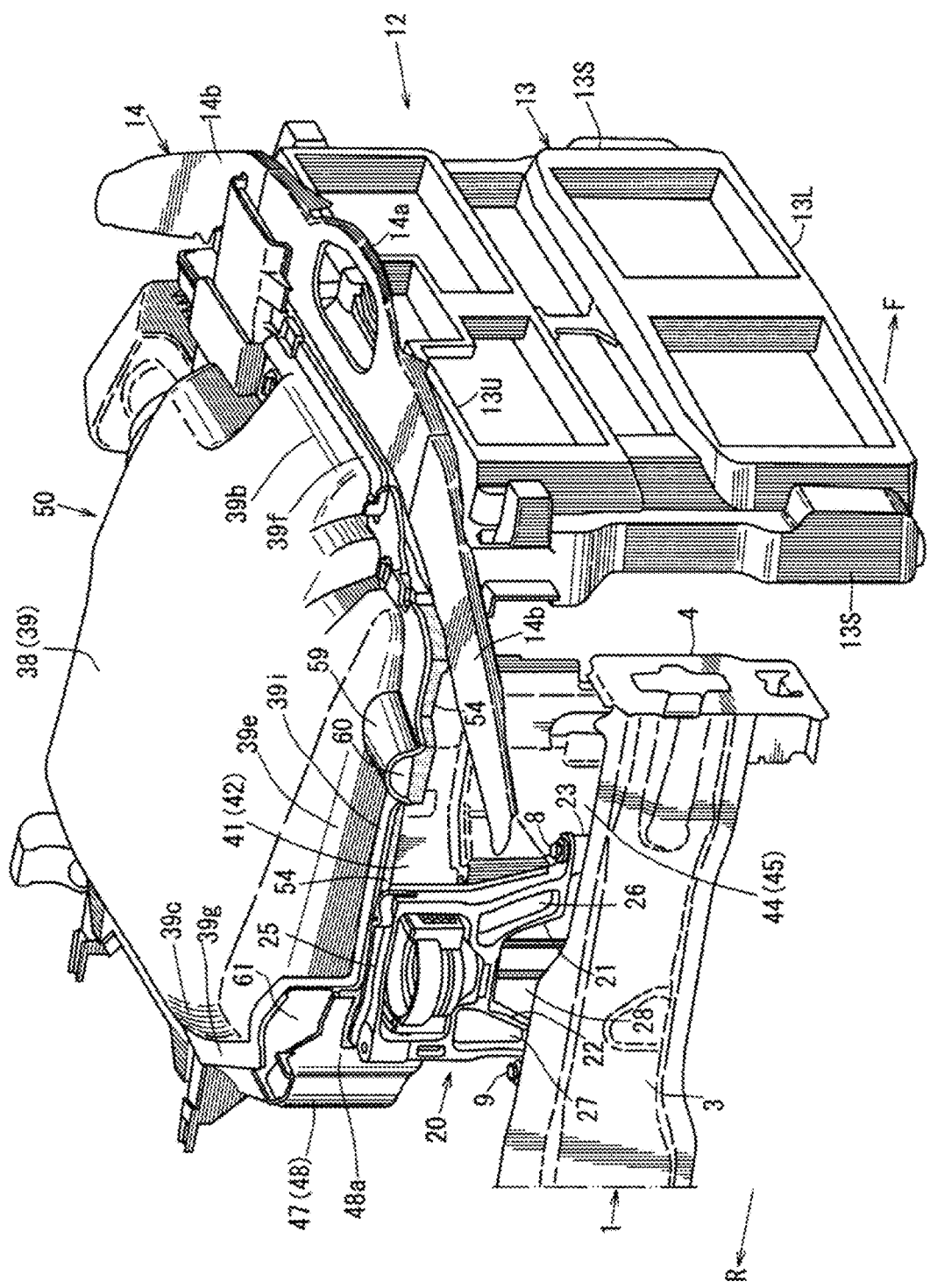
FIG. 1 is a perspective view illustrating a heat retention structure of an engine according to the present disclosure.
Figure 2:
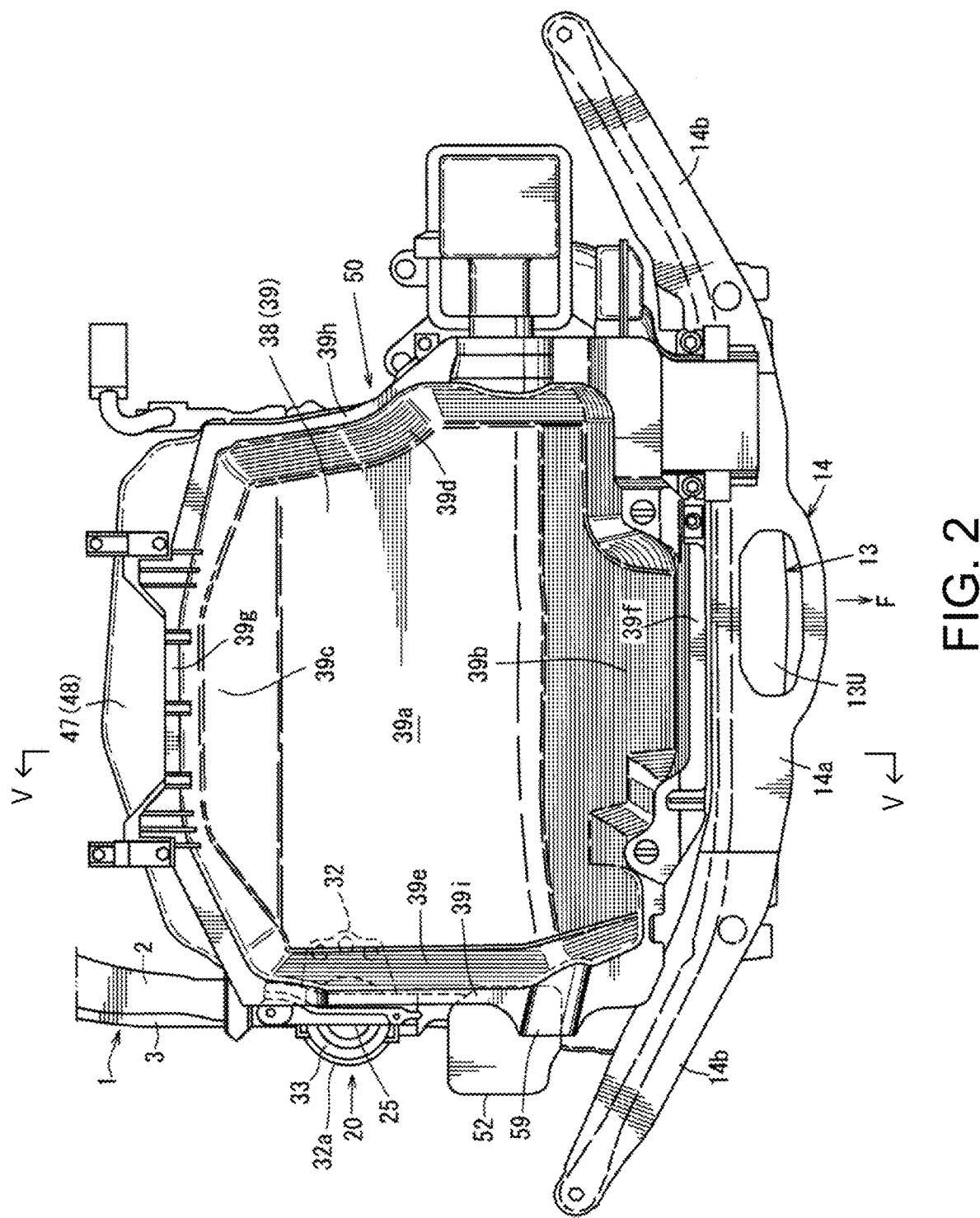
FIG. 2 is a plan view of FIG. 1.
Figure 3:
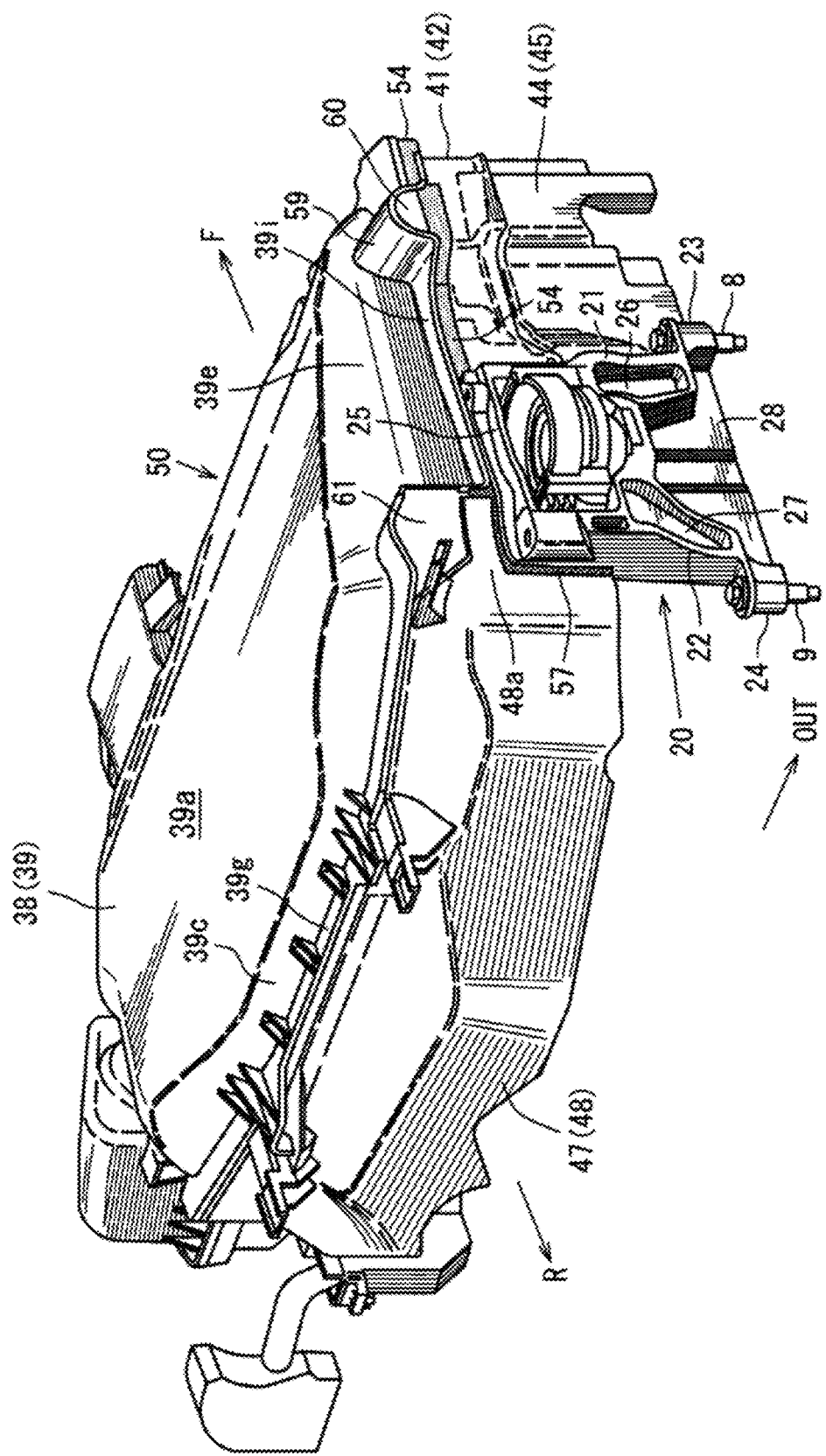
FIG. 3 is a perspective view illustrating the heat retention structure of the engine seen from a rear upper position of a vehicle.
Figure 4:
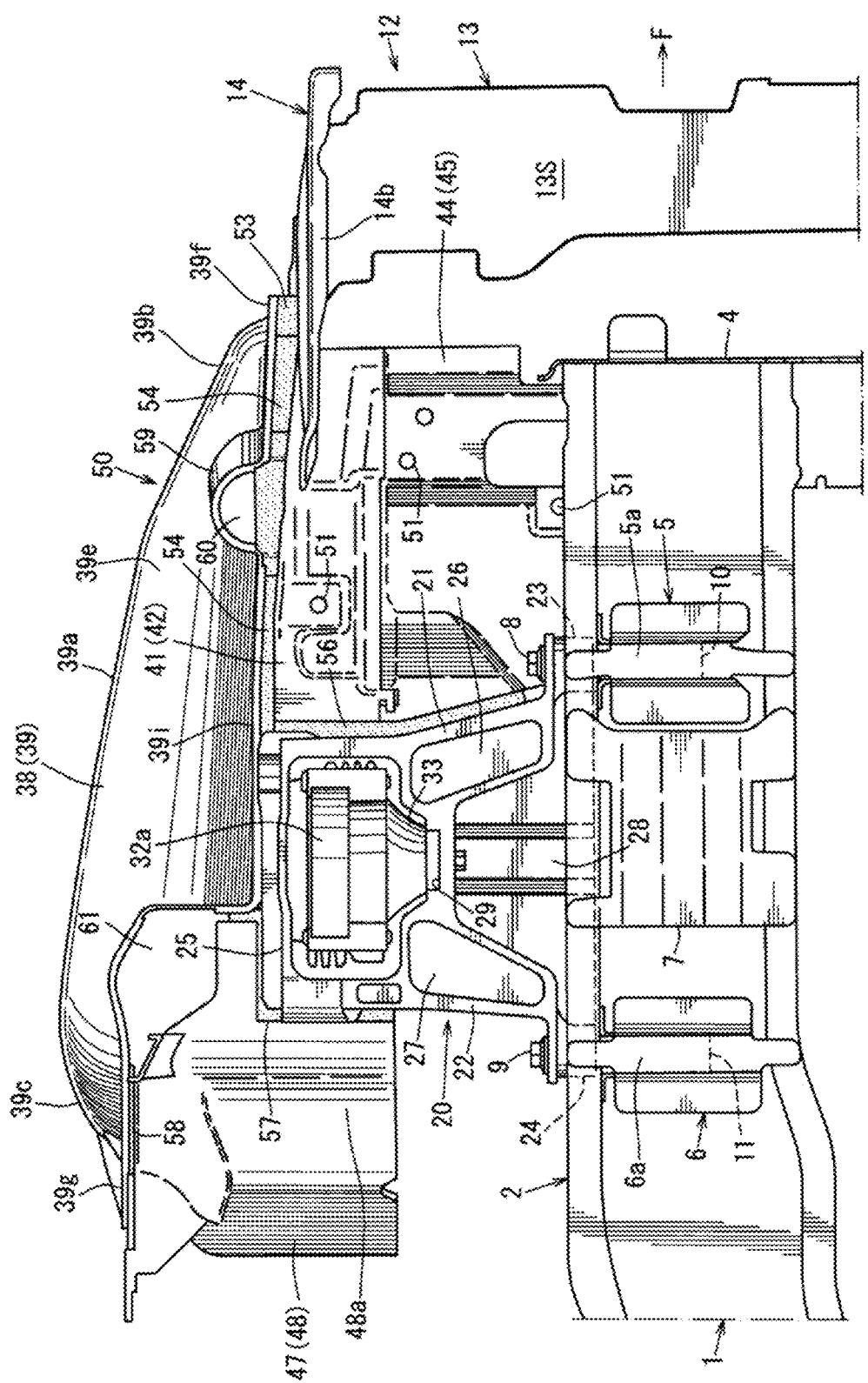
FIG. 4 is a right-side view illustrating the heat retention structure of the engine seen from an outward position in vehicle width directions.
Figure 5:
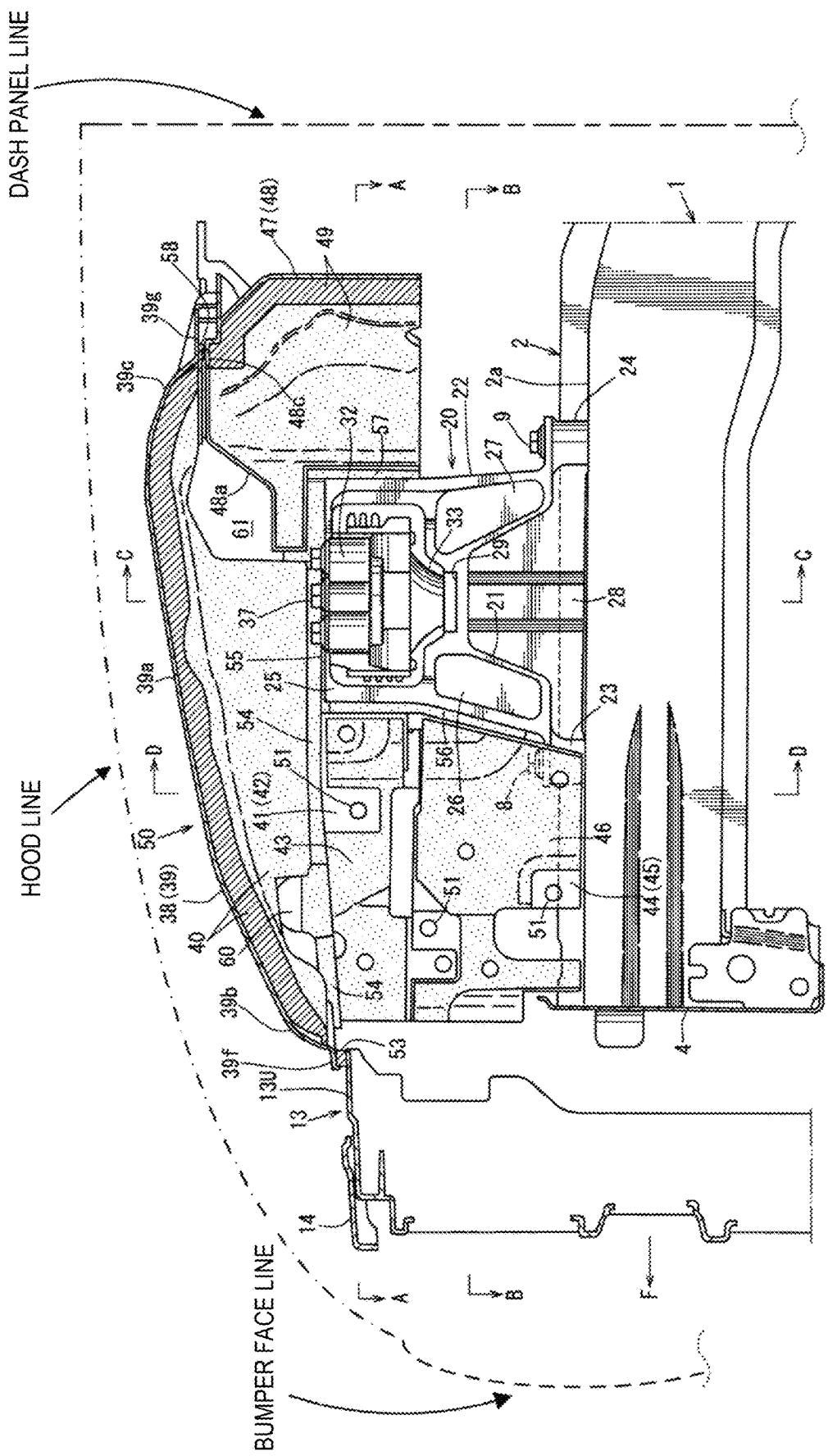
FIG. 5 is a cross-sectional view taken along a line V-V of FIG. 2.

Below, one embodiment of the present disclosure is described in detail based on the accompanying drawings. The drawings illustrate a heat retention structure of an engine, where FIG. 1 is a perspective view of the heat retention structure seen from an upper right position, FIG. 2 is a plan view of FIG. 1, FIG. 3 is a perspective view of the heat retention structure seen from a rear upper position, FIG. 4 is a right side view illustrating the heat retention structure seen from an outward position in vehicle width directions, and FIG. 5 is a left side view illustrating the heat retention structure seen from an inward position in the vehicle width directions.

Note that throughout the drawings, an arrow F indicates forward of the vehicle, an arrow R indicates rearward of the vehicle, an arrow IN indicates inward in the vehicle width directions, an arrow OUT indicates outward in the vehicle width directions, and an arrow UP indicates upward of the vehicle.

Before describing the heat retention structure, a body structure of a vehicle is first described. As illustrated in FIGS. 1, 2, 4 and 5, the vehicle is provided with front side frames 1 extending forward from a dash lower panel at both left and right sides of an engine bay. The engine bay has walls formed by various components of the vehicle body. As shown in dashed lines in FIGS. 5, 7, and 9, the engine bay includes for example, an upper wall formed by a hood (bonnet) of the vehicle, two side walls formed by left and right apron panels and fender panels of the vehicle, a front wall formed by a front bumper of the vehicle, and a rear wall formed by a dash panel of the vehicle.

The front side frame 1 is a body reinforcement member which is formed by joining and fixing a front side frame inner 2 and a front side frame outer 3 and forms a closed cross-section 1A (see FIG. 9) extending in longitudinal directions of the vehicle. A set plate 4 for mounting a crash can is provided at a front end of the front side frame 1 (see FIGS. 1, 4 and 5). Note that in the drawings, only the right-hand side front side frame 1 is illustrated for the convenience of the illustration.

Figure 9:
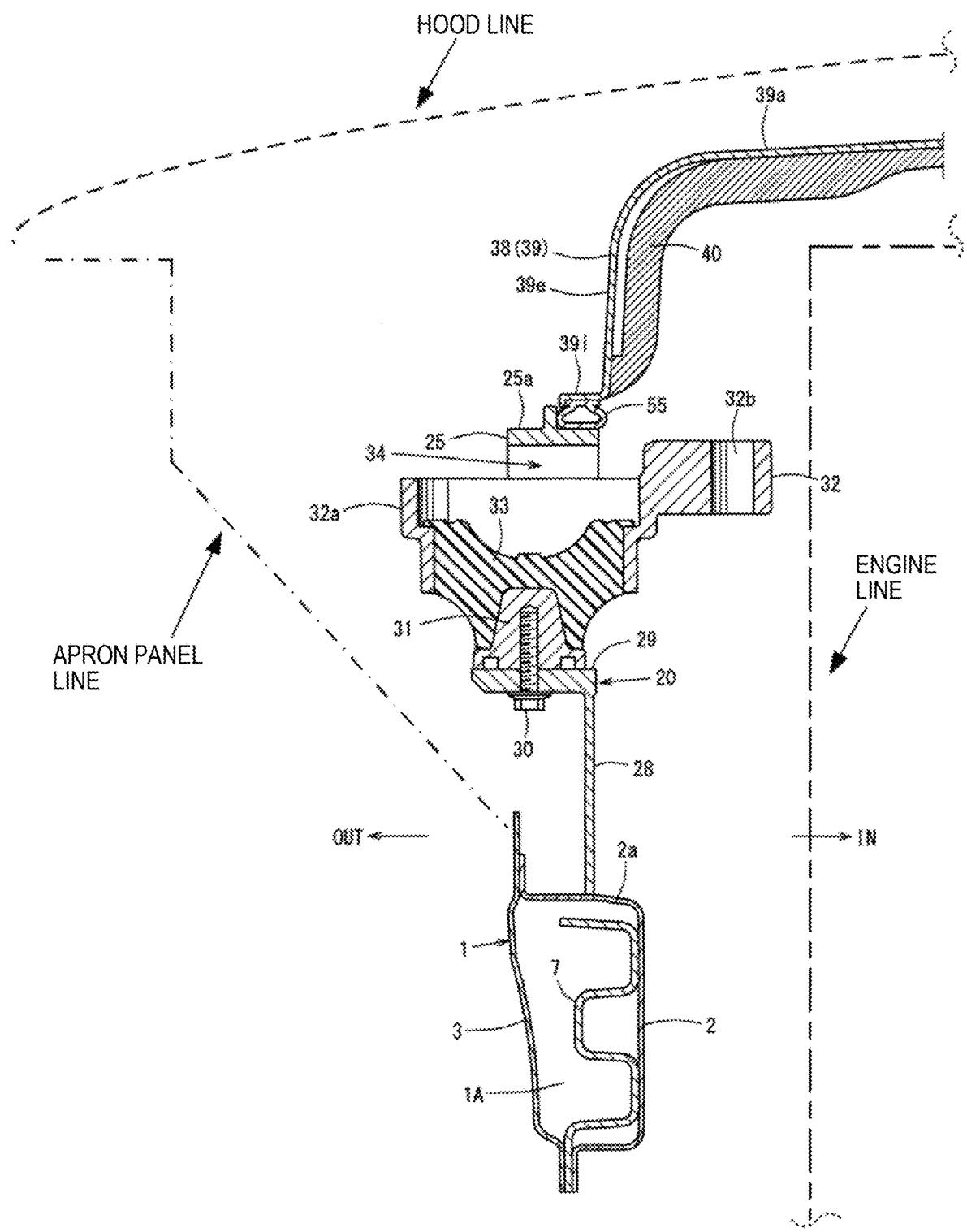
FIG. 9 is a cross-sectional view taken along a line C-C of FIG. 5.

As illustrated in FIGS. 4 and 9, inside the closed cross-section 1A of the front side frame 1, in order to fasten and fix an engine mount bracket 20 (described later) thereto, a pair of front and rear retainers 5 and 6 corresponding to the attachment positions of the engine mount bracket 20 are joined and fixed to the front side frame 1. Also inside the closed cross-section 1A, a gusset 7 is joined and fixed to the front side frame 1 between the pair of front and rear retainers 5 and 6, as a reinforcement member. The retainers 5 and 6 have parts 5a and 6a each having a channel shape in the plan view. The channel shaped parts 5a and 6a extend in vertical directions, and fixedly hold cylindrical nut members 10 and 11 extending in the vertical directions with which bolts 8 and 9 for fastening the mount bracket are threadedly engaged, respectively. A shroud 12 is provided forward of the engine bay (see also FIG. 1).

As illustrated in FIG. 1, the shroud 12 includes a shroud panel 13 covering a radiator and/or a condenser as a heat exchanger, and a shroud upper member 14 located above the shroud panel 13. The shroud panel 13 is constructed by integrally forming an upper member 13U and a lower member 13L, and left and right side members 13S and 13S which vertically couple the upper and lower members 13U and 13L to form a substantially rectangular frame shape. The shroud upper member 14 is constructed by integrally coupling a shroud upper member center 14a located at the center in the vehicle width directions to shroud upper member sides 14b and 14b located on both ends in the vehicle width directions of the shroud upper member center 14a. Both left and right ends of the left and right shroud upper member sides 14b and 14b are coupled to an apron, respectively. As illustrated in FIGS. 1 to 5, the engine mount bracket 20, which supports the engine mount on the front side frame 1 which is the body reinforcement member, is provided.

Figure 6:
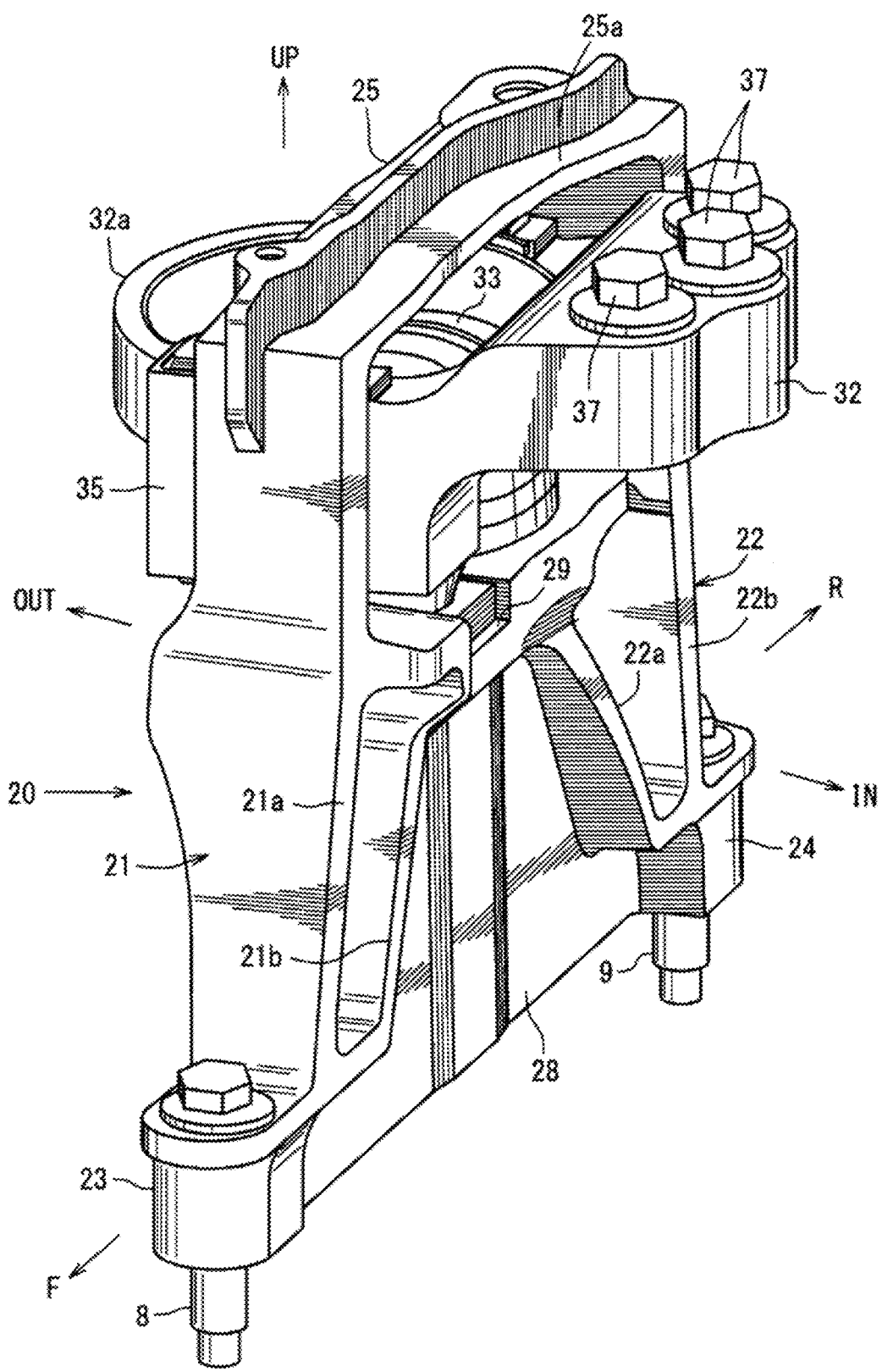
FIG. 6 is a perspective view of a mount bracket.
Figure 7:
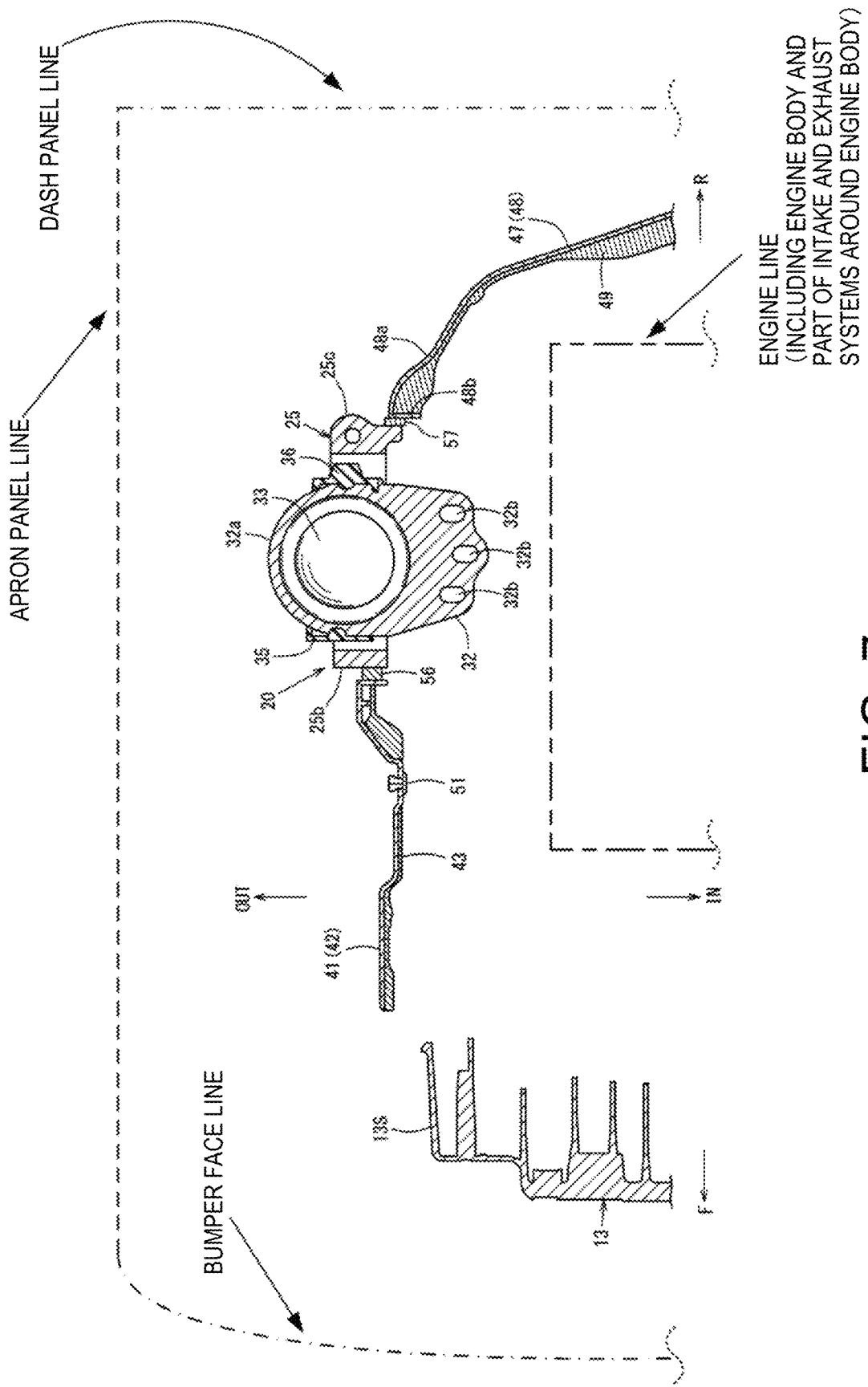
FIG. 7 is a cross-sectional view taken along a line A-A of FIG. 5.
Figure 8:
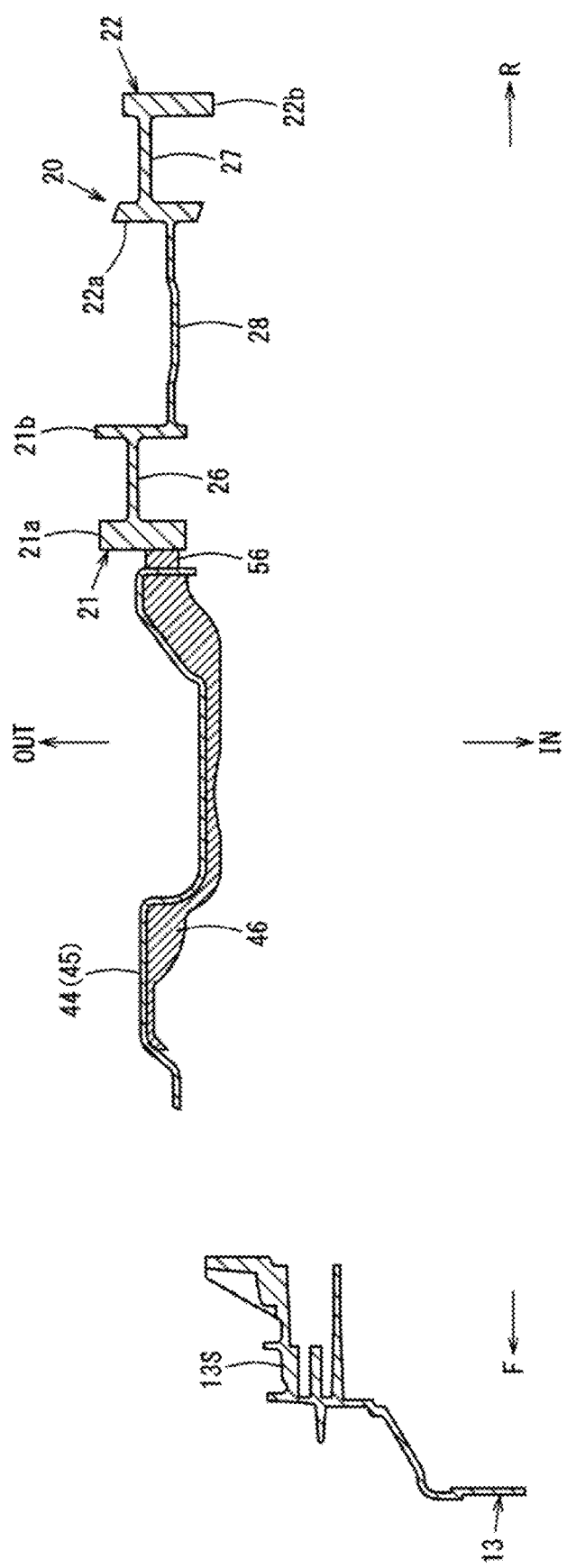
FIG. 8 is a cross-sectional view taken along a line B-B of FIG. 5.
Figure 10:
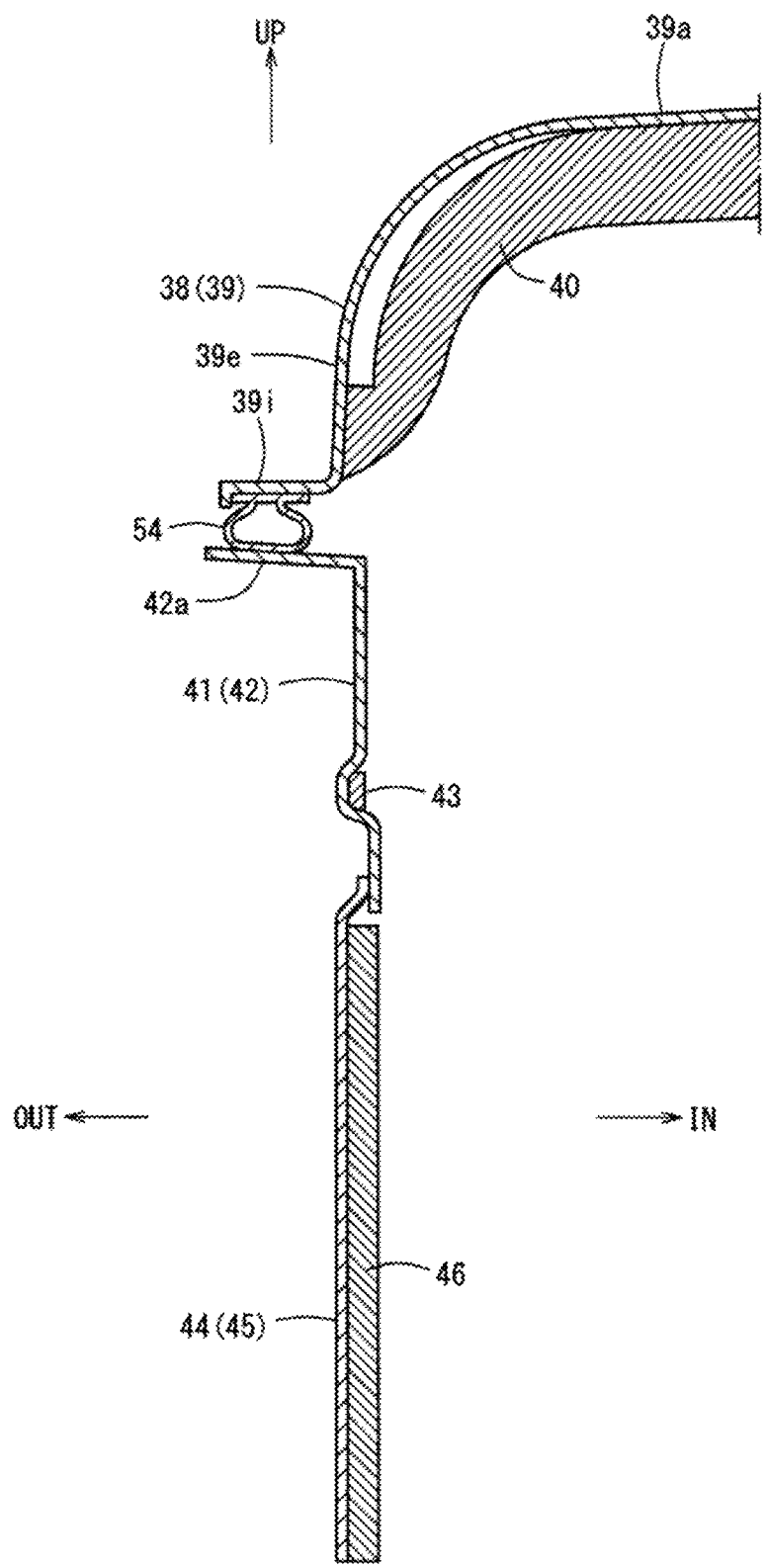
FIG. 10 is a cross-sectional view of a substantial part taken along a line D-D of FIG. 5.

FIG. 6 is a perspective view of the engine mount bracket 20, FIG. 7 is a cross-sectional view taken along a line A-A of FIG. 5, FIG. 8 is a cross-sectional view taken along a line B-B of FIG. 5, and FIG. 9 is a cross-sectional view taken along a line C-C of FIG. 5, and FIG. 10 is a cross-sectional view of a substantial part taken along a line D-D of FIG. 5.

As illustrated by the side views in FIGS. 4 and 5, and also illustrated by the perspective view in FIG. 6, the engine mount bracket 20 (body-side mount bracket) includes front and rear leg parts 21 and 22, two, front and rear attachment seats 23 and 24 as attachment parts formed in bottom parts of the leg parts 21 and 22, respectively, and a frame-shaped part 25 provided in top parts of the leg parts 21 and 22, all of which are integrally formed by aluminum die casting.

As illustrated in FIGS. 4 and 5, the engine mount bracket 20 is attached to an upper surface of the front side frame 1 through the front and rear attachment seats 23 and 24 at two locations. In detail, by fastening the pair of front and rear bolts 8 and 9 to the nut members 10 and 11, respectively, the attachment seats 23 and 24 of the engine mount bracket 20 are attached to an upper surface 2a of the front side frame inner 2.

As illustrated in FIGS. 4, 5, and 8, vertical wall parts 26, 27, and 28 are integrally formed with the engine mount bracket 20 to cover up the space between the two front and rear attachment seats 23 and 24.

As illustrated in FIGS. 6 and 8, the front leg part 21 of the engine mount bracket 20 has a front piece 21a and a rear piece 21b, and the wall thickness of the vertical wall part 26 in the vehicle width directions which couples the front piece 21a and the rear piece 21b is made thinner than the wall thickness of the front piece 21a and the rear piece 21b in the vehicle width directions.

Similarly, as illustrating in FIGS. 6 and 8, the rear leg part 22 of the engine mount bracket 20 also has a front piece 22a and a rear piece 22b, and the wall thickness of a vertical wall part 27 in the vehicle width directions which couples the front piece 22a and the rear piece 22b is made thinner than the wall thickness of the front piece 22a and the rear piece 22b in the vehicle width directions. The vertical wall part 28 couples the rear piece 21b of the front leg part 21 and the front piece 22a of the rear leg part 22, and the wall thickness of the vertical wall parts 28 in the vehicle width directions is made thinner than the wall thickness of the rear piece 21b and the front piece 22a in the vehicle width directions.

Thus, since the front pieces 21a and 22a and the rear pieces 21b and 22b constituting the leg parts 21 and 22 are made thicker, the rigidity of the engine mount bracket 20 is secured. At the same time, since the vertical wall parts 26, 27, and 28 are made thinner, the weight of the engine mount bracket 20 is reduced. Further, because of the vertical wall parts 26, 27, and 28, an loss of heat via the engine mount bracket 20 is reduced.

As illustrated in FIG. 9, the engine mount bracket 20 uses a bolt 30 to attach a core bar member 31 to a recessed bottom part 29 of the frame-shaped part 25, and a mount rubber 33 intervenes between the core bar member 31, and an outer cylinder 32a of an arm part 32 which is an engine-side mount bracket. Here, the arm part 32 (engine-side mount bracket) may have a vertically dividable structure in consideration of processability.

The mount rubber 33 is provided ranging from an inner circumferential part of the outer cylinder 32*a* to an outer circumferential part of the core bar member 31, and a space 34 is formed between the mount rubber 33 and an upper part of the outer cylinder 32*a*, and the mount bracket part thereabove, i.e., an upper piece part 25*a* of the frame-shaped part 25.

As illustrated in FIG. 7, additional mount rubbers 35 and 36 are vulcanized-adhered to an outer surface of the outer cylinder 32*a* which opposes to a front piece part 25*b* and a rear piece part 25*c* of the frame-shaped part 25.

As illustrating in FIGS. 7 and 9, the arm part 32 extends straightly inward in the vehicle width directions from the mount rubber 33 toward the engine, and as illustrated in FIG. 9, it is disposed at substantially the same height as the space 34. A plurality of attachment holes 32*b* are formed in the extended part of the arm part 32 which extends straightly inward in the vehicle width directions from the mount rubber 33 toward the engine, and the engine is mounted to the arm part 32 using bolts 37 (see FIGS. 5 and 6) inserted into the attachment holes 32*b*. The mount rubber 33 functions as a buffer between the arm part 32 and the engine mount bracket 20 when the engine vibrates and displaces, and the other mount rubbers 35 and 36 function as buffers between the opposing member when the engine vibrates and displaces.

Meanwhile, as illustrated in FIGS. 1, 3 and 4, the heat retention structure includes a dedicated heat retention member 50 comprised of an upper lid part 38 covering the engine from above so as to be openable and closable, an upper side-wall part 41 and a lower side-wall part 44 covering a side of the engine, and a rear wall part 47 covering a back side of the engine. A side wall (not shown) opposite the upper side-wall part 41 and lower side-wall part 44 may also be included.

As illustrated in FIG. 5, the upper lid part 38 includes an upper surface cover 39 made of synthetic resin as the outer cover, and a heat retention member 40 made of a glass wool material, a urethane material, etc. which is disposed inside the upper surface cover 39 so as to be integral with the upper surface cover 39.

As illustrated in FIG. 7, the upper side-wall part 41 includes an upper side-surface cover 42 made of synthetic resin as the outer cover, and a heat retention member 43 made of a glass wool material, a urethane material, etc. which is disposed inside the upper side-surface cover 42 so as to be integral with the upper side-surface cover 42.

As illustrated in FIG. 8, the lower side-wall part 44 includes a lower side-surface cover 45 made of synthetic resin as the outer cover, and a heat retention member 46 made of a glass wool material, a urethane material, etc. which is disposed inside the lower side-surface cover 45 so as to be integral with the lower side-surface cover 45.

As illustrated in FIGS. 5 and 7, the rear wall part 47 includes a rear surface cover 48 made of synthetic resin as the outer cover, and a heat retention member 49 made of a glass wool material, a urethane material, etc. which is disposed inside the rear surface cover 48 so as to be integral with the rear surface cover 48.

As illustrated in FIG. 2, the upper surface cover 39 which constitutes the upper lid part 38 is integrally formed with flange parts 39*f*, 39*g*, 39*h*, and 39*i* at the front, rear, right, and left of a top-plate part 39*a* through skirt parts 39*b*, 39*c*, 39*d*, and 39*e*.

Moreover, as illustrated in FIGS. 4, 5 and 7, a right end of the rear surface cover 48 which constitutes the rear wall part 47 is integrally formed with a forward extended part 48*a* so that it turns around forward.

A lower end of the forward extended part 48*a* is set at substantially the same height as a lower end of the upper side-wall part 41. As illustrated in FIG. 7, a flange part 48*b* is formed in a front end of the forward extended part 48*a*, and as illustrated in FIG. 5, a flange part 48*c* is also formed in an upper end of the forward extended part 48*a*.

As illustrated in FIGS. 4 and 5, a side portion between the upper side-wall part 41 and the forward extended part 48*a*, and a side portion rearward of the lower side-wall part 44 are not provided with side-wall parts, and the side portions are substituted with the engine mount bracket 20 which supports the mount of the engine. Thus, a portion of the side-wall parts of the heat retention member 50 is substituted with the engine mount bracket 20 so that the side-wall parts are omitted by the portion, thereby reducing the weight and cost of the heat retention member 50.

As illustrated in FIGS. 4 and 5, the upper side-wall part 41 and the lower side-wall part 44 are attached to and supported by a subtank 52 (see FIG. 2) using the fasteners 51.

As illustrated in FIG. 10, an upper end of the lower side-wall part 44 is provided so as to overlap with a lower end of the upper side-wall part 41 outwardly in the vehicle width directions, and a flange part 42*a* is integrally formed with an upper end of the upper side-surface cover 42 which constitutes the upper side-wall part 41.

As illustrated in FIG. 5, a seal member 53 seals between the flange part 39*f* on the front side of the upper surface cover 39 which constitutes the upper lid part 38, and an upper member 13U of the shroud panel 13.

As illustrated in FIGS. 4, 5, 9, and 10, the right flange part 39*i* of the upper surface cover 39 of the upper lid part 38 is placed on and supported by the flange part 42*a* of the upper side-surface cover 42 and the upper piece part 25*a* of the frame-shaped part 25 of the engine mount bracket 20, and as illustrated in FIGS. 4 and 10, a seal member 54 seals between the flange part 39*i* of the upper surface cover 39 and the flange part 42*a* of the upper side-surface cover 42.

Moreover, as illustrated in FIG. 9, a seal member 55 seals between the flange part 39*i* of the upper surface cover 39 and the upper piece part 25*a* of the frame-shaped part 25 of the engine mount bracket 20.

Further, as illustrated in FIGS. 4 and 7, a seal member 56 seals between the front leg part 21 of the engine mount bracket 20 and the front piece part 25*b* of the frame-shaped part 25, and a back-end surface of the upper and lower side-wall parts 41 and 44.

Further, as illustrated in FIGS. 4, 5, and 7, a seal member 57 seals between the rear piece part 25*c* of the frame-shaped part 25 of the engine mount bracket 20 and the flange part 48*b* at the front end of the forward extended part 48*a* of the rear wall part 47. In addition, as illustrated in FIGS. 4 and 5, a seal member 58 seals between the rear flange part 39*g* of the upper surface cover 39 of the upper lid part 38 and the flange part 48*c* at the upper end of the forward extended part 48*a* of the rear wall part 47.

As illustrated in FIGS. 1, 3, and 4, a semi-cylindrical guide part 59 extending outwardly in the vehicle width directions is formed from an intermediate part of the skirt part 39*e* in the vehicle longitudinal directions in the right part of the upper lid part 38. A space 60 into which a harness or a pipe member is inserted is formed below the guide part 59. Since the harness or the pipe member inserted in the space 60 is wrapped around with heat-insulating material, there is worry about heat loss via the space 60. A space 61 into which a harness or a pipe member is inserted is also formed between a rear part of the skirt part 39e of the upper lid part 38 and an upper part of the forward extended part 48a of the rear wall part 47. Since the harness or the pipe member is inserted into the space 61 is similarly wrapped around with heat-insulating material, heat loss via the space 61 is not a concern.

As described above, the heat retention structure of the engine according to this embodiment includes the dedicated heat retention member 50 comprised of the upper lid part 38 covering the engine from above to be openable and closable, and the side-wall parts (the upper side-wall parts 41 and the lower side-wall parts 44) covering the side of the engine. The portion of the side-wall parts is comprised of the engine mount bracket 20 which supports the mount of the engine (see FIGS. 1 and 4).

According to this structure, since the portion of the side-wall parts of the heat retention member 50 is substituted with the engine mount bracket 20 so that side-wall parts are omitted by the portion, the weight and cost of the heat retention member 50 are thereby reduced.

In this embodiment, the engine mount bracket 20 is attached to the upper surface of the front side frame 1 at the two, front and rear attachment parts (the attachment seats 23 and 24). The vertical wall parts 26, 27, and 28 are formed in the engine mount bracket 20 so as to cover the space between the two attachment parts (the attachment seats 23 and 24) (see FIG. 4).

According to this structure, since the vertical wall parts 26, 27, and 28 are formed, heat loss via the engine mount bracket 20 is reduced.

In this embodiment, the upper lid part 38 is placed on and supported by the upper surface part (in detail, the upper piece part 25a of the frame-shaped part 25) of the engine mount bracket 20 (see FIGS. 4 and 9).

According to this structure, since the upper lid part 38 is supported by the upper surface part of the engine mount bracket 20, the support rigidity for supporting the upper lid part 38 is improved, and the load applied to the side-wall parts 41 and 44 of the heat retention member 50 is reduced.

In this embodiment, the mount rubber 33 is attached to the engine mount bracket 20, and the space 34 is formed between the mount rubber 33 and the mount bracket part (the upper piece part 25a of the frame-shaped part 25) above the mount rubber 33. The engine mount bracket 20 is provided with the arm part 32 straightly extending inward in the vehicle width directions from the mount rubber 33 toward the engine (see FIGS. 2, 7, and 9).

According to this structure, since the engine mount bracket 20 is provided with the arm part 32 extending laterally from the mount rubber 33 toward the engine, the arm part 32 prevents the heat which goes upward from the lower part of mount rubber 33 from escaping through the space 34.

In this embodiment, the arm part 32 is disposed substantially at the same height as the space 34 (see FIG. 9).

According to this structure, since the arm part 32 is disposed substantially at the same height as the space 34, heat loss via the space 34 is further reduced.

Between the structure of the present disclosure and the structure of this embodiment, the side-wall parts of the present disclosure correspond to the upper side-wall part 41 and the lower side-wall part 44 of this embodiment. Similarly, the front and rear attachment parts at the two locations of the engine mount bracket correspond to the attachment seats 23 and 24, the upper surface part of the engine mount bracket corresponds to the upper piece part 25a of the frame-shaped part 25, and the mount bracket part above the mount rubber corresponds to the upper piece part 25a of the frame-shaped part 25. However, the present disclosure is not limited only to the structure of this embodiment.

As described above, the present disclosure is useful for the heat retention structure of the engine provided with the dedicated heat retention member comprised of the upper lid part covering the engine from above to be openable and closable, and the side-wall parts covering the sides of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Front Side Frame
20 Engine Mount Bracket
23, 24 Attachment Seat (Attachment Part)
25a Upper Piece Part (Mount Bracket Part)
26, 27, 28 Vertical Wall Part
32 Arm Part
33 Mount Rubber
34 Space
38 Upper Lid Part
41 Upper Side-wall Part (Side-wall Part)
44 Lower Side-wall Part (Side-wall Part)
50 Heat retention Member

What is claimed is:

1. A vehicle, comprising:
an engine bay having an upper wall, side walls, a front wall, and a rear wall;
an engine disposed inside the engine bay;
a dedicated heat retention member provided inside the engine bay, the dedicated heat retention member comprising an upper lid covering the engine from above to be openable and closable, and side-wall parts covering a side of the engine,
wherein a portion of the side-wall parts is comprised of an engine mount bracket configured to support a mount of the engine, instead of the dedicated heat retention member;
wherein the upper lid has no openings;
wherein the engine mount bracket includes a vertical wall extending in a longitudinal direction of the vehicle to be positioned adjacent to the side-wall parts of the dedicated heat retention member; and
wherein a lower portion of the vertical wall is attached to a frame of the vehicle, and an upper portion of the engine mount bracket is attached to the upper lid; and
wherein the side-wall parts are positioned between the upper lid and the frame of the vehicle.

2. The vehicle of claim 1, wherein the engine mount bracket is attached to an upper surface of a front side frame of the frame at two, front and rear, attachment parts, and the vertical wall is formed in the engine mount bracket to cover a space between the front and rear attachment parts.

3. The vehicle of claim 1, wherein the side-wall parts of the dedicated heat retention member are comprised of a resin member, and the engine mount bracket is comprised of a metal member, and wherein the upper lid is placed on and supported by an upper surface part of the engine mount bracket.

4. The vehicle of claim 1, wherein a mount rubber is attached to the engine mount bracket, and
wherein a space is formed between the mount rubber and a mount bracket part above the mount rubber, and an arm part extending straight inward in vehicle width directions from the mount rubber toward the engine is provided.

5. The vehicle of claim 4, wherein the arm part is disposed substantially at a same height as the space.

* * * * *